United States Patent [19]

Koketsu

[11] Patent Number: 5,137,397
[45] Date of Patent: Aug. 11, 1992

[54] CUTTING TOOL AND METHOD FOR USING THE SAME

[75] Inventor: Hitoshi Koketsu, Nakatsugawa, Japan

[73] Assignee: Kabushiki Kaisha Higashihara Kogyosho, Gifu, Japan

[21] Appl. No.: 600,424

[22] Filed: Oct. 19, 1990

[51] Int. Cl.⁵ .............................. B23B 35/00
[52] U.S. Cl. .................. 408/1 R; 408/93; 82/1.11; 82/123; 29/566
[58] Field of Search ........ 29/27 C, 27 R, 566; 408/227, 233, 186–188, 93, 23, 21, 180; 82/1.2, 1.3, 1.4, 1.5, 1.11, 123, 82, 129

[56] References Cited

U.S. PATENT DOCUMENTS

| | | | |
|---|---|---|---|
| 3,617,144 | 7/1969 | Koppelmann | 408/187 |
| 3,726,162 | 4/1973 | Sato | 82/129 X |
| 4,211,510 | 7/1980 | Hopkins | 408/186 |
| 4,375,708 | 3/1983 | Hellnick et al. | 82/1.11 X |
| 4,382,726 | 5/1983 | Jud | 408/186 X |
| 4,612,832 | 9/1986 | Vshigoe et al. | 29/36 X |
| 4,621,957 | 11/1986 | Dillard et al. | 408/188 X |
| 4,676,702 | 6/1987 | Reinauer | 408/188 X |

FOREIGN PATENT DOCUMENTS

| | | | |
|---|---|---|---|
| 0145719 | 1/1981 | Fed. Rep. of Germany | 408/226 |
| 0927480 | 5/1982 | U.S.S.R. | 82/118 |

*Primary Examiner*—Larry I. Schwartz
*Assistant Examiner*—Julie R. Daulton
*Attorney, Agent, or Firm*—Heller, Ehrman, White & McAuliffe

[57] ABSTRACT

A cutting tool for finishing a back surface of a workpiece having a hole is proposed. A blade having an equilateral triangular shape is attached to a shaft of the cutting tool. One of cutting edges formed along the sides of the blade projects transversely of the shaft. The tip of the projecting cutting edge comes to contact the workpiece's back surface. When the workpiece is rotated and the shaft is moved in the diametrical direction relative to the hole, the cutting edge tip grinds the back surface. At this time, if the shaft moves in the longitudinal direction of the workpiece, the blade creates a notch in communication with the hole on the workpiece's back surface, resulting in a stepped borehole.

12 Claims, 4 Drawing Sheets

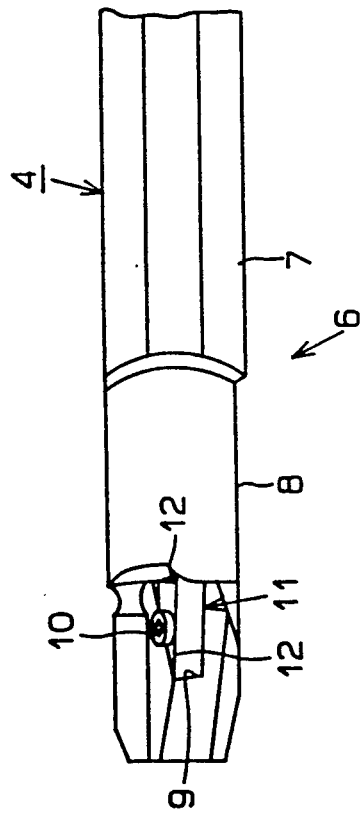
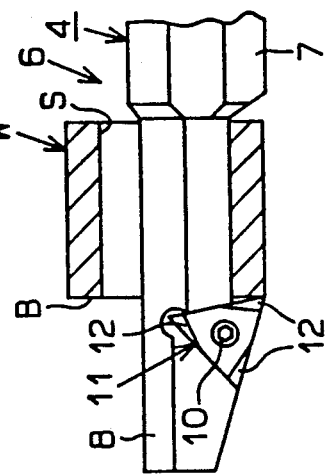
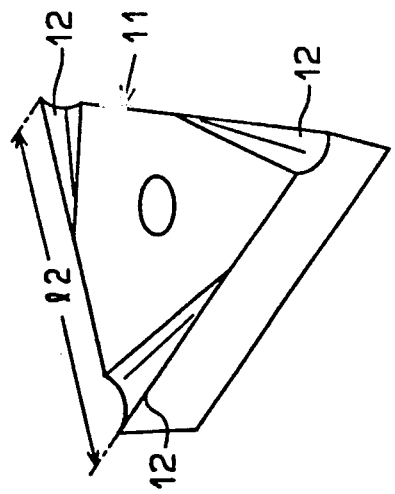

CUTTING TOOL AND METHOD FOR USING THE SAME

BACKGROUND OF THE INVENTION

1. Field of the Invention

The present invention relates generally to a cutting tool used for numerically controlled lathes and the like. More particularly, the present invention relates to a cutting tool and method for finishing a back surface of a workpiece held by a chuck and for forming a stepped borehole on such a workpiece.

2. Description of the Related Art

Connectors attached to hydraulic hoses and the like should be brazed to mating members to insure a good seal. Therefore, the front and back surfaces of such connectors must be smooth so as to be firmly fitted to the mating members.

A prior art method of forming such a connector is shown in FIG. 8. A workpiece W is turned on a lathe or the like to form smooth contact surfaces. The workpiece W has a preliminarily drilled borehole S, having a predetermined internal diameter in accordance with the connector's intended design. After the front surface F of the workpiece W is finished by a known method, a prior art cutting tool 52 having a diamond shaped blade 53 is inserted into the borehole S. The blade 53 is carried by a shaft 54. As the shaft 54 is rotated, the blade 53 cuts the back surface B of the workpiece W.

The blade 53 has cutting edges 55, one of which is set to cut the workpiece W with a working angle (defined as shown in FIG. 9 as the angle between the cutting edge and the direction of the axis around which the cutting edge is rotated) $\theta 1$ of about 90 degrees. The entire length of the cutting edge 55 needs to be used for cutting the back surface B of the workpiece W. Each side L of the blade 53 must be sufficiently long to assure that the blade has adequate strength for the cutting operation. Therefore, the critical length of each side becomes a limiting factor when trying to make smaller tools. In other words, the width d1 of the blade 53 must be relatively large, necessitating a large width D1 for the cutting tool 52 itself.

Accordingly, when the borehole S is small in accordance with the desired internal bore of the finished workpiece W, the cutting tool 52 may be too wide to be inserted into the hole S. The prior art cutting tool 52 may thus be incapable of being used for finishing the back surface of a workpiece of its borehole is too small.

The prior art cutting tool 52 may also be used for forming a stepped hole 57 having a notch 56 of a predetermined depth on the back surface B as shown in FIG. 9. This can be done by moving the cutting tool 52 backward by a predetermined distance while cutting the back surface B.

In this case also, a cutting tool 52 having large width D1 cannot be inserted into a small diameter borehole in order to form such a stepped borehole 57 on the back surface B of the workpiece W.

In addition, the entire length of the cutting edge 55 is required to machine the back surface B of the workpiece W, so that the blade 53 will cut the back surface B unevenly when there are even slight vibrations of the workpiece W which are unavoidable during metal machining operations.

SUMMARY OF THE INVENTION

Accordingly, a primary object of the present invention is to provide a cutting tool which can perform a finishing process on a back surface of a workpiece which has a small diameter hole, and a method for using such a cutting tool.

Another object of the present invention is to provide a cutting tool which can perform the finishing process on the back surface of a workpiece with high accuracy.

Still another object of the present invention is to provide a cutting tool which can form a stepped borehole on the back surface of a workpiece having a small diameter hole.

According to a first aspect of the present invention, a cutting tool for processing the back surface of a workpiece preliminarily formed with a borehole has a shaft, to which is affixed a blade having an equilateral triangular shape. At least one side of the blade has a cutting edge which projects transversely from a side surface of the shaft.

According to a second aspect of the present invention, a cutting edge of a blade has a working angle of more than 90 degrees.

According to a third aspect of the present invention, a shaft having an equilateral triangular blade fixed thereto is inserted into a hole which has been preliminarily formed in a workpiece. A tip of one of cutting edges which are formed at least on one side of the blade is brought into contact with the workpiece's back surface. Thereafter, the workpiece starts to rotate and the shaft is moved in the diametrical direction of the hole to move the cutting edge tip onto the workpiece's back surface.

BRIEF DESCRIPTION OF THE DRAWINGS

The features of the present invention that are believed to be novel are set forth with particularity in the appended claims. The invention, together with the objects and advantages thereof may best be understood with reference to the following description of the presently preferred embodiments together with the accompanying drawings in which:

FIG. 3 is a side view of the cutting tool shown in FIG. 2.

FIG. 4 is an enlarged perspective view showing a blade.

FIG. 5 is a plan sectional view showing the blade contacting the back surface of a workpiece.

DETAILED DESCRIPTION OF THE PREFERRED EMBODIMENTS

Figure 1:
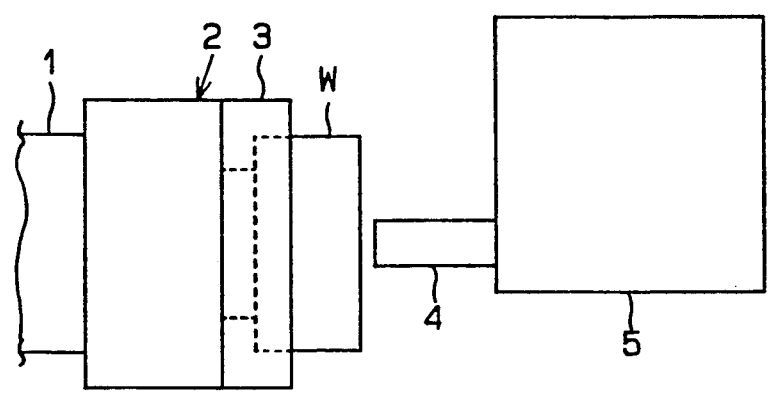
FIG. 1 is a schematic plan view showing a cutting tool of a first embodiment of the present invention with a lathe.

As illustrated in the drawings, a preferred first embodiment of the present invention will be described in detail first.

As shown in FIG. 1, a chuck 2 is attached to a drive shaft 1 of a rotary driving mechanism (not shown) of a lathe. The chuck 2 rotates together with the drive shaft 1 and has a holding portion 3. A workpiece W is held by the holding portion 3.

A support 5 is disposed at a position opposing the chuck 2 to support a shaft 4. The support is movable back and forth, and right and left.

As shown in FIGS. 2 to 5, the shaft 4 has a hexagonal base 7, which is fixed to the support 5, and a reduced diameter arm 8, which extends axially from the base 7. A recess 9 is formed on the arm 8 and has a blade 11 detachably fixed thereto by means of a bolt 10. The blade 11 has an equilateral triangle shape in a plan view.

Figure 2:
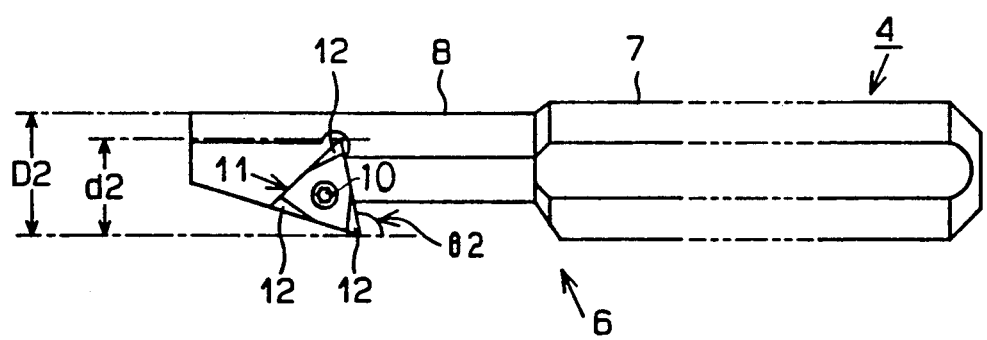
FIG. 2 is a plan view of the cutting tool.

As shown in FIG. 4, each side of the blade 11 has a cutting edge 12 formed along half of the side 12. One of these cutting edges 12 extends outward from one side of the arm 8 in a direction generally perpendicular to the longitudinal direction of the shaft 4 and faces the base 7. This cutting edge 12 has a working angle $\theta 2$ (defined as shown in FIG. 2 as the angle between its extension and the direction of the shaft 4 around which it rotates) of more than 90 degrees. As shown in FIG. 5, the arm 8 of the shaft 4 is inserted into a borehole S in the workpiece W. The tip of the cutting edge 12 is then brought into contact with the workpiece's back surface. In this embodiment, the thickness of the workpiece W (thickness between the outer and inner peripheral surfaces of the workpiece W) is equal to the distance by which the cutting edge 12 projects from the shaft 4, that is, it is equal to the effective cutting length of the cutting edge 12. The shaft 4 moves in accordance with the back and forth movement (right and left in the FIGS.) of the support 5. The workpiece W rotates in accordance with the rotation of the drive shaft 1. Thus, the tip of the cutting edge 12 finishes the entire back surface of the workpiece W.

When the sharpness of the cutting edge 12 is deteriorated after extended use of the blade 11, the blade 11 can be rotated to project another cutting edge 12 from the shaft 4 by loosing the bolt 10.

A method for using the foregoing cutting tool will be described next.

The boreholes is formed in the workpiece W by means of a known drilling tool, and the work's front surface is finished by using conventional techniques. Then, by moving the support 5 forward, the arm 8 of the shaft 4 is inserted into the borehole S as shown in FIG. 5. The shaft 4 is disposed eccentrically with respect to the hole S. During insertion, the side surface of the shaft 4 is positioned nearly in contact with the internal surface of the borehole S. The blade 11 is passed through the workpiece, and the tip of the cutting edge 12 is brought into contact with the workpiece's back surface B.

Thus, the tip of the cutting edge 12 machines the entire back surface B of the workpiece W in accordance with rotations of the drive shaft 1 and with movements of the support 5.

The work's back surface B is machined by the tip of the cutting edge 12 successively, so that the machining is hardly affected by slight vibrations of the workpiece W. Therefore, the back surface B can be machined evenly, resulting in a good finishing.

In this embodiment, the blade 11 is formed in an equilateral triangular shape, so that the projecting length of the cutting edge 12 from the arm 8 is reduced. Thus, the width d2 of the blade 11 is decreased and it decreases the entire width D2 of the shaft 4.

Figure 7:
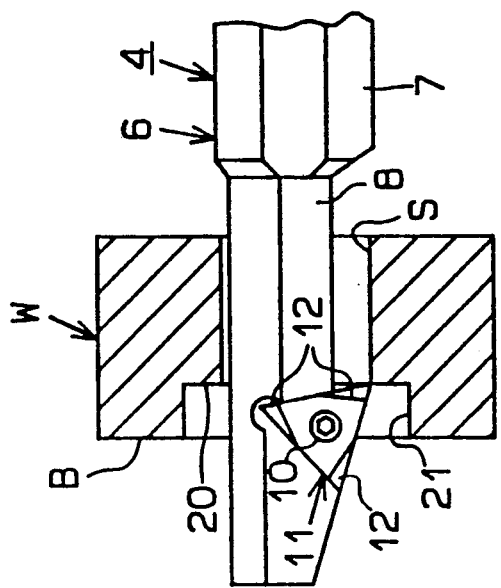
FIG. 7 is a plan sectional view showing a stepped borehole formed on the workpiece's back surface by using the cutting tool of FIGS. 1 and 2.
Figure 6:
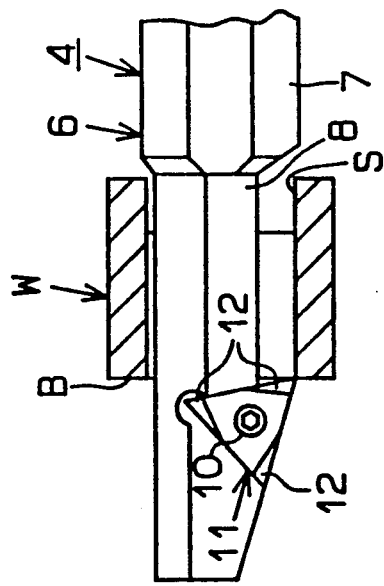
FIG. 6 is a plan sectional view showing the workpiece as shown in FIG. 5 at a point later in the back surface finishing process.
Figure 8:
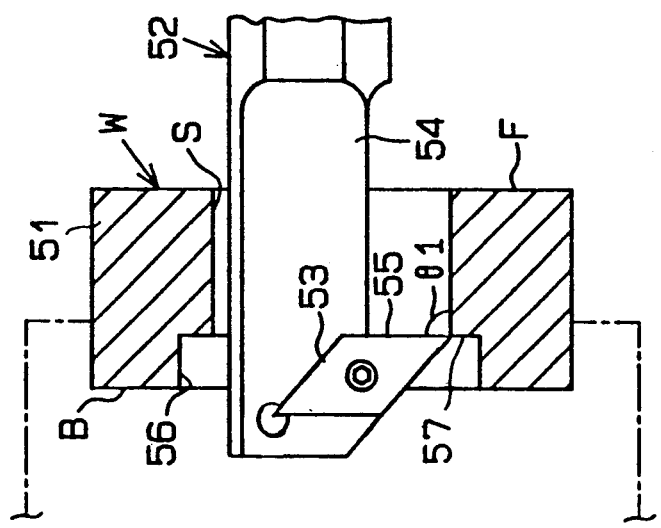
FIG. 8 is a plan sectional view showing a prior art cutting tool finishing the workpiece's back surface.
Figure 9:
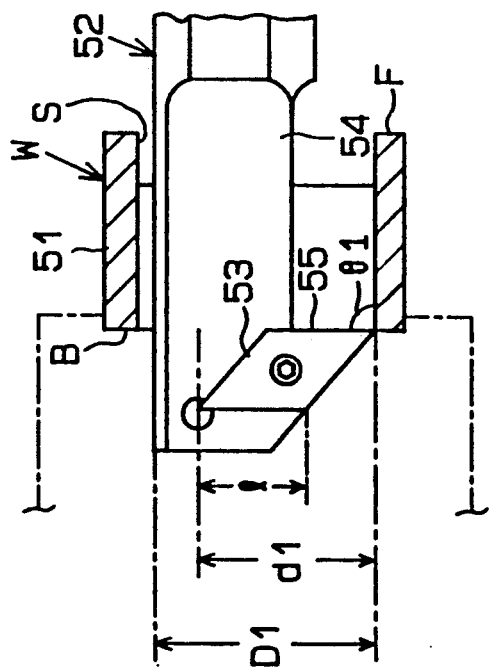
FIGS. 9 is a plan sectional view showing a prior art cutting tool forming a stepped borehole on the workpiece's back surface.

Accordingly, the shaft 4 can be inserted into a smaller hole S, so that a workpiece W having such a smaller hole S can be finished by the cutting tool of the present invention. A second embodiment of the present invention will be explained next with reference to FIG. 7.

In this embodiment, a stepped borehole 20 is to be formed on the back surface B. After the arm 8 is inserted into the hole S of the workpiece W, the shaft 4 is moved backward a predetermined distance by means of the support 5. Thus, the blade 11 grinds the workpiece W to form a notch 21 having a predetermined depth on the back surface B of the workpiece W in communication with the borehole S, to form the stepped borehole 20.

In this case also. the triangular blade 11 allows the use of a shaft 4 having smaller width D1. Thus, the tool can be used on workpieces having smaller boreholes S. Therefore, the stepped borehole finishing process on the workpieces back surface B can be performed effectively even if the pieces have boreholes with small diameters.

After the stepped borehole 20 is formed, it is desirable to finish the unfinished back surface B of the workpiece W by means of another similar cutting tool having a blade of which a cutting edge has a larger projection length.

Although only a few embodiments of the present invention have been described above, it should be apparent to those skilled in the art that the present invention may be embodied in many other specific forms without departing from the spirit or scope of the invention. Therefore the present examples and embodiments are to be considered as illustrative and not restrictive and the invention is not to be limited to the details given herein, but may be modified within the scope of the appended claims.

What is claimed is:

1. A cutting tool for machining a back surface of a workpiece having a borehole by passing through said borehole to reach said back surface, the tool comprising:
    a shaft having a base part with a side surface and a blade-supporting part, said blade-supporting part extending longitudinally from said base part and being substantially thinner than said base part so as to be able to pass through the borehole; and
    a substantially triangular blade piece having three sides and three corners and being mounted to said blade-supporting part of the shaft, one of said three corners projecting radially farther outward than said side surface of said base, said blade piece having a cutting edge on at least one of said sides abutting said one corner, said one side facing towards said base part, said one side making an angle of greater than 90 degrees with a line drawn-longitudinally from said one corner towards said base part.

2. A cutting tool as set forth in claim 1 wherein said base part is supported by a support; said blade-supporting part extending from said base part through the borehole for supporting the blade piece.

3. A cutting tool as set forth in claim 1 further comprising mounting means for removably mounting said blade piece to the shaft.

4. A cutting tool as set forth in claim 3 wherein:
said blade piece has a substantially equilateral triangular shape and has a cutting surface on each of said three sides, only one of the cutting surfaces projecting radially outward from said side surface; and
said mounting means allows the blade piece to be rotated so as to cause another one of said cutting surface to project radially outward from said side surface.

5. A cutting tool for machining a back surface of a workpiece having a borehole by passing through said borehole to reach said back surface, the tool comprising:
a longitudinally extending shaft including a base part to be received by a support and a blade-supporting part which extends longitudinally from said base part and is substantially. thinner than said base part so as to be able to pass through said borehole;
a blade piece having a substantially equilateral triangular shape with three sides and three corners including cutting edges individually on said three sides; and
mounting means for mounting the blade piece to said blade-supporting part of the shaft, the mounting means positioning the blade piece such that one of said corners projects farther outward radially from said blade-supporting part than the others of said corners, that one of said sides abutting said one corner is facing towards said base part and that said one side makes an angle of greater than 90 degrees with a line drawn longitudinally from said one corner towards said base part.

6. A method of processing a workpiece, the method comprising the steps of:
boring a borehole through said workpiece between its front and back surfaces;
passing an elongated blade-supporting member of a tool through the borehole from its front surface until a cutting edge on a blade piece mounted to said blade-supporting member can reach said back surface, said blade-supporting member being substantially thinner than and extending from a longitudinally elongated base part having a side surface, said blade piece having a substantially equilateral triangular shape with three sides, said cutting edge being on one of said three sides, said cutting edge projecting radially farther outward than said side surface of said base part;
causing a tip of said cutting edge to contact the back surface of said workpiece while said blade-supporting member is extended through the borehole, said one side making an angle of greater than 90 degrees with a line drawn longitudinally from said tip towards said base part;
rotating said workpiece relative to the tool; and
moving said blade-supporting member in the diametrical direction of the borehole to machine the contacted surface of said workpiece.

7. A method as set forth in claim 6 wherein said workpiece is a coupling member for a hydraulic line.

8. A method as set forth in claim 6 wherein said blade piece has a cutting edge on each of said three sides.

9. A method as set forth in claim 6 wherein said blade piece is removably mounted to said blade-supporting part.

10. A method as set forth in claim 7 further comprising the steps of moving said tool in a longitudinal direction relative to said workpiece while said workpiece is being rotated so as to form a notch in communication with and around said borehole.

11. A method as set forth in claim 10 wherein said workpiece is a coupling member for a hydraulic line.

12. A method as set forth claim 10 wherein said blade piece has a cutting edge on each of said three sides.

* * * * *